US012360384B2

(12) United States Patent
Qin et al.

(10) Patent No.: US 12,360,384 B2
(45) Date of Patent: Jul. 15, 2025

(54) POLARIZATION-DEPENDENT AUGMENTED REALITY DISPLAY

(71) Applicant: GOOGLE LLC, Mountain View, CA (US)

(72) Inventors: Yi Qin, Mountain View, CA (US); Oscar Alberto Martinez, Mountain View, CA (US); Serge Joel Armand Bierhuizen, San Jose, CA (US); Xinda Hu, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 606 days.

(21) Appl. No.: 17/638,641

(22) PCT Filed: Sep. 4, 2019

(86) PCT No.: PCT/US2019/049531
§ 371 (c)(1),
(2) Date: Feb. 25, 2022

(87) PCT Pub. No.: WO2021/045743
PCT Pub. Date: Mar. 11, 2021

(65) Prior Publication Data
US 2022/0299786 A1        Sep. 22, 2022

(51) Int. Cl.
*G02B 27/28* (2006.01)
*G02B 5/30* (2006.01)
*G02B 27/01* (2006.01)
*G02B 27/42* (2006.01)

(52) U.S. Cl.
CPC ......... *G02B 27/283* (2013.01); *G02B 5/3025* (2013.01); *G02B 27/0172* (2013.01); *G02B 27/4205* (2013.01)

(58) Field of Classification Search
CPC ............ G02B 27/283; G02B 5/3025; G02B 27/0172; G02B 27/4205
USPC ...................................... 359/489.08
See application file for complete search history.

(56) References Cited

U.S. PATENT DOCUMENTS

| | | | |
|---|---|---|---|
| 2016/0131898 A1* | 5/2016 | Chen | G02B 5/30 349/11 |
| 2017/0090194 A1* | 3/2017 | Hayes | G02B 27/0101 |
| 2017/0336539 A1* | 11/2017 | Perreault | G02B 3/04 |
| 2017/0343829 A1* | 11/2017 | Huang | G02B 27/01 |
| 2018/0107000 A1* | 4/2018 | Sung | G02B 3/10 |
| 2018/0210222 A1 | 6/2018 | Seo et al. | |
| 2019/0171005 A1* | 6/2019 | Lee | G02B 6/005 |

(Continued)

OTHER PUBLICATIONS

Translation of Chinese Office Action mailed Mar. 12, 2024 for CN Application No. 201980097654.1, 19 pages.

(Continued)

*Primary Examiner* — Sharrief I Broome (57) ABSTRACT

A device provides light for augmented reality vision. The device includes a display that emits light toward a beam splitter. The beam splitter reflects light from the display toward a polarization-dependent lens. The beam splitter allows world scene light to pass therethrough to the polarization-dependent lens. The polarization-dependent lens directs display light and world scene light toward a non-polarization-dependent lens positioned at an eye-ward side of the polarization-dependent lens.

23 Claims, 4 Drawing Sheets

(56) References Cited

U.S. PATENT DOCUMENTS

2019/0171026 A1* 6/2019 Parsons .................... G02B 5/26
2019/0219826 A1* 7/2019 Taketani ............ G02B 27/0172

OTHER PUBLICATIONS

International Search Report and Written Opinion mailed Jun. 15, 2020 for corresponding International Application No. PCT/US2019/049531, 12 pages.
European Office Action mailed Jul. 20, 2023 for European Application No. 19858647.1, 6 pages.
International Preliminary Report on Patentability mailed Mar. 17, 2022 for corresponding International Application No. PCT/US2019/049531, 9 pages.
Translation of Chinese Office Action mailed Oct. 31, 2024 for Chinese Application No. 201980097654.1, 13 pages.

* cited by examiner

POLARIZATION-DEPENDENT AUGMENTED REALITY DISPLAY

CROSS-REFERENCE TO RELATED APPLICATIONS

The present application is a U.S. National Stage under 35 U.S.C. § 371 of International Patent Application Serial No. PCT/US2019/049531, entitled "POLARIZATION-DEPENDENT AUGMENTED REALITY DISPLAY" and filed on 4 Sep. 2019, the entirety of which is incorporated by reference herein.

BACKGROUND

Some head mounted displays (HMDs) are implemented to provide an augmented reality (AR) experience in which generated graphics are superimposed on or combined with light coming from the real world. Various techniques for providing this superimposition of display-generated light on real-world light can be implemented with polarization-dependent (PD) lenses. Such lenses provide improved realistic effects of combining computer-generated content with real world views generally. Virtual reality (VR) type displays provide vision based on completely computer-generated images. While VR is typically limited to fields such as games and VR, AR may be applied to various environments in the real world. AR has attracted attention as the next-generation display technology suitable for many environments. AR is an example of mixed reality (MR) where a mixture of the real world and additional information are presented together to a user.

To produce AR, some techniques use a liquid crystal (LC) lens in combination with a display. The LC lens is a type of switchable display device capable of altering light provided by the display based on a polarity of incident light. Challenges remain to shrink the size of various components and to operate polarization-dependent components in AR- and VR-based HMDs.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Techniques described herein use a polarization-dependent (PD) lens, such as a liquid crystal (LC) lens, that can be used as a switchable display device capable of altering light provided by a display such as a head mounted display (HMD). In an LC device, phase distribution is controlled and determined by reorientation of LC molecules under an external electric or magnetic field. The LC lens has the ability to direct light to a desired location based on an alignment direction of its LC layer and a polarization of light incident on the LC lens. By using a PD lens, light can be provided to a user by changing polarization conditions of light emitted from the display and operation of the LC lens.

FIGS. 1-6 illustrate arrangements of components in an HMD device for augmented reality (AR) vision provided by a PD lens and a method of operation for the HMD device according to some embodiments. Broadly, the AR vision is provided by an AR device having the various components. The PD lens controls or shapes delivery of light to the user as the light travels along a light path in the HMD. Embodiments of the PD lens in a first electro-magnetic state exhibit a first, positive focal length with respect to incident light having a first polarization state and a second, negative focal length for incident light having a second polarization state. In a second electro-magnetic state, the PD lens exhibits a different behavior with respect to the light incident thereon. In general, PD lenses exhibit a focal length varying according to polarization of the incident light. The first electro-magnetic state can be application of a first electric field or magnetic field, and the second electro-magnetic state can be withdrawal of the first electric or magnetic field to the PD lens. Generally, these PD lens states typically are related to circularly polarized light states of light incident thereon. In the HMD, the PD lens functions as a focusing lens (e.g., convex lens) having a positive refractive power with respect to the incident light having the first light polarization state where the first light polarization state may be, for example, a right-hand circularly polarized (RCP) state and having a negative refractive power for the second polarization state such as a left-hand circularly polarized (LCP) state. The HMD with the PD lens provides one or more focal planes of display-generated light to a user's eye. A non-polarization dependent (NPD) lens has a constant focal length regardless of the polarization of its incident light.

Various embodiments described herein provide certain benefits, including power savings and providing display-generated light having increased brightness and size compared to conventional techniques. For example, a smaller display can be used in the HMD compared to conventional HMDs. Using at least the PD lens, light originating from the display is magnified by one or more components in the light path between the display and user eye. In certain embodiments, light received from a world scene is not magnified and passes substantially unmodified to the eye through the HMD. The various embodiments can deliver light in an optically efficient manner based on light originating from a display. In certain embodiments, the optical efficiency is approximately 100% for polarized light and 50% for non-polarized display light with relatively little or no see-through distortion. Further, various embodiments provide a compact and lightweight HMD for the user.

Figure 1:
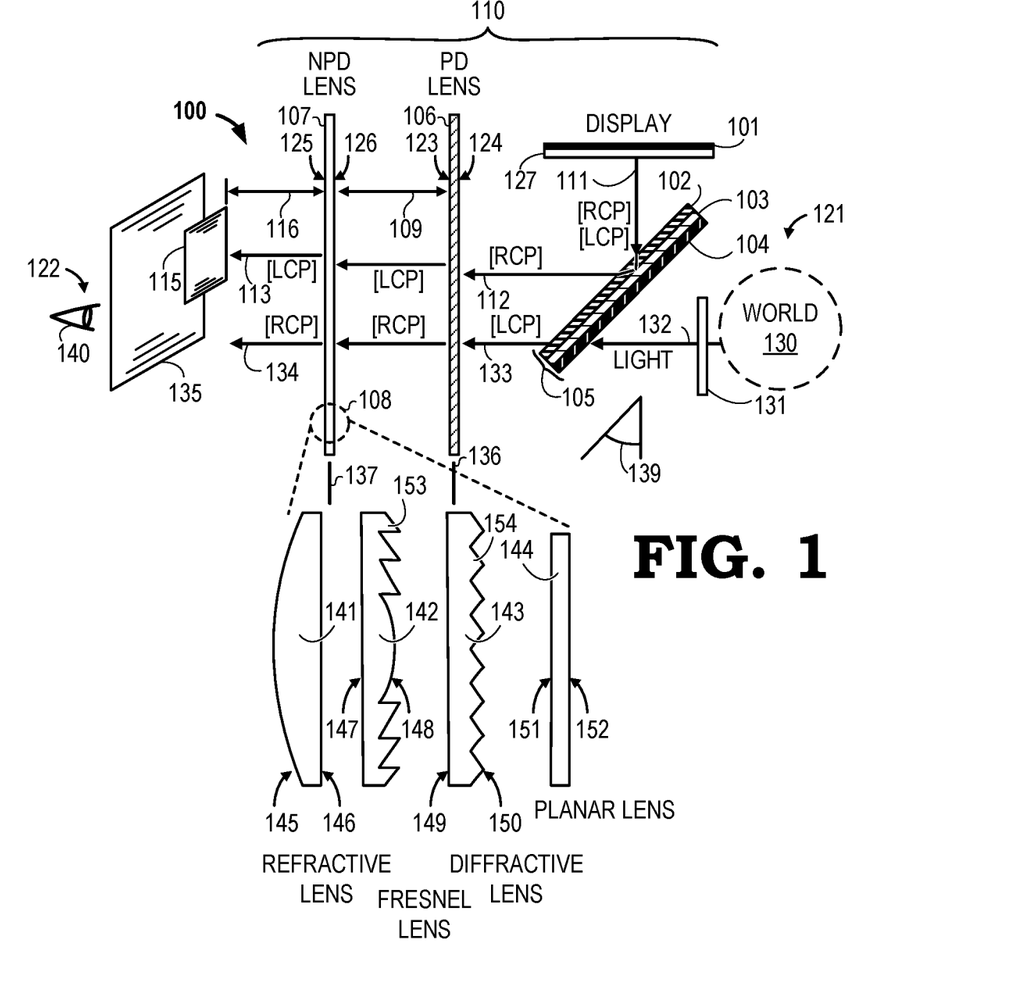
FIG. 1 is a block diagram of a system providing a polarization-dependent (PD) lens for an HMD according to some embodiments.

FIG. 1 is a cross-section view of a system 100 implementing a PD lens 106 for an HMD according to some embodiments. The system 100 includes various components along a light path 110 between a world-facing side 121 and an eye-ward side 122 of the system 100, such as a display 101, a beam splitter 105, the PD lens 106, and an NPD lens 107. The beam splitter 105 includes one or more layers or components to adapt light incident onto the PD lens 106. As illustrated, in at least one embodiment, the beam splitter 105 includes a quarter wave plate (QWP) 102, a polarization beam splitter (PBS) 103, and a linear polarizer (LP) 104. In some embodiments, components of the beam splitter 105 take the form of one or more passive layers of material (e.g., a film, a coating, a lens) having certain light-altering properties. The PD lens 106 is generally planar and oriented at a substantially perpendicular orientation in the light path 110 as indicated by an axis 136 of the PD lens 106. The PD lens 106 is an example of an electro-optic polarization element. In some embodiments, the NPD lens 107 also is generally planar and oriented at a substantially perpendicular orientation in the light path 110 as indicated by an axis 137 of the NPD lens 107.

The beam splitter 105 is oriented at an incidence angle 139 of, for example, approximately 5, 10, 12, 15, 20, 25 30, 35, 40, 45, or some other number of degrees relative to a user eye 140 at the eye-ward side 122 of the light path 110. In some embodiments, the beam splitter 105 is fixed in place and oriented at an angle with respect to the display 101. In some embodiments, the display 101 is oriented to approximately perpendicularly to one or more of the PD lens 106 and the NPD lens 107. In other embodiments, the display 101 is oriented at a first angle relative to the beam splitter 105 as measured by display light incident on the beam splitter 105, and one or more of the PD lens 106 and the NPD lens 107 are oriented at a same or different second angle relative to the beam splitter 105 as measured by light received therefrom, wherein the first and second angles are between zero and 90 degrees.

On the world-facing side 121, a world-facing scene 130 provides light 132 to the system 100. As a result of the beam splitter 105, left-hand circularly polarized (LCP) light 133 leaves the beam splitter 105 and is incident on the PD lens 106. According to some embodiments, a world-facing component 131 is present between the beam splitter 105 and the world-facing scene 130 to alter light from the world-facing scene 130 destined for the user eye 140. The world-facing component 131 includes one or more layers that alter one or more parameters of the world-facing scene light 132 before the world-facing scene light 132 reaches the beam splitter 105. For example, the world-facing component 131 alters a focus distance (e.g., a prescriptive lens to correct imperfect vision) or a polarization direction or polarization state.

An output from the system 100 at the eye-ward side 122 includes at least two focal planes 115, 135 with respect to the user eye 140. The light represented by these focal planes 115, 135 overlap in a combined view to support AR vision. A first focal plane 115 is based on display light 111 emitted from the display 101. The light 111 from the display 101 may be non-polarized light (non-linear- or non-circularly-polarized light) or may be polarized light (linear- or circularly-polarized light). In some embodiments, the display 101 includes one or more components 127 such as an LP, and a QWP in the form of one or more layers that alter the light emitted from light producing elements (not illustrated) of the display 101. One or both of right-hand circularly polarized (RCP) light or LCP light is incident on the beam splitter 105 from the display 101. RCP light 112 is reflected from the beam splitter 105 and directed to a second surface 124 of the PD lens 106. Based on a first state of the PD lens 106 (e.g., based on providing an electric current to the PD lens 106), LCP light from a first surface 123 of the PD lens 106 is directed onto a second surface 126 of the NPD lens 107.

Based on the first state of the PD lens 106, RCP light from the first surface 123 of the PD lens 106 is directed onto the second surface 126 of the NPD lens 107. That is, RCP light and LCP light incident on the PD lens 106 are treated differently by the PD lens 106 as the light passes through the PD lens 106. For example, the PD lens has a negative optical power (focal length) to RCP light and the PD lens has a positive optical power (focal length) to LCP light. Based on one or more properties of the NPD lens 107, the LCP light 113 and the RCP light 134 are formed into the first focal plane 115 and a second focal plane 135, respectively, at the eye-ward side 122 of the system 100. Based at least in part on a distance 109 between the PD lens 106 and the NPD lens 107, the first and second focal planes 115, 135 are provided to or focused a distance 116 on the eye-ward side 122 of the system.

As illustrated by inset 108, a first surface 125 and a second surface 126 of the NPD lens 107 can take a particular form or can be shaped to suit one or more geometries of other components in the system 100 so that the first and second focal planes 115, 135 are clear and in focus at the eye-ward side 122 of the system 100. For example, the NPD lens 107 can take the form of a refractive lens 141 having a convex first surface 145 and a generally planar second surface 146. In certain embodiments, the first surface 145 is a continuously convex surface along a working portion or working surface of the first surface 145. As another example, the NPD lens 107 takes the form of a Fresnel lens 142 having a generally planar first surface 147 and prisms 153 of varying dimensions, from prism to prism, on a second surface 148. For example, a first height of one or more prisms is different from a second height of one or more other prisms of the Fresnel lens 142. In another example, a first width of one or more prisms is different from a second width of one or more other prisms of the Fresnel lens 142.

As yet another example, the NPD lens 107 takes the form of a diffractive lens 143 having a generally planar first surface 149 and prisms 154 of a generally uniform dimension, from prism to prism, on a second surface 150. In yet another example, the NPD lens 107 takes the form of a planar lens 144 having a generally planar first and second surfaces 151, 152.

Based at least on a characteristic of the NPD lens 107 or a characteristic or operation of the PD lens 106 and the distance 109 between these two components, the first focal plane 115 is magnified relative to light provided by other AR-based systems. Generally, a size of the focal plane 115 is larger than a size of the display 101. The system 100 then is able to use a relatively small display and still provide a substantially large first focal plane 115 and large field-of-view (FOV) of the AR-based light 111 from the display 101. Having a smaller display 101 allows the system 100 to save power in comparison to conventional AR-based systems and to provide a wide FOV.

Figure 2:
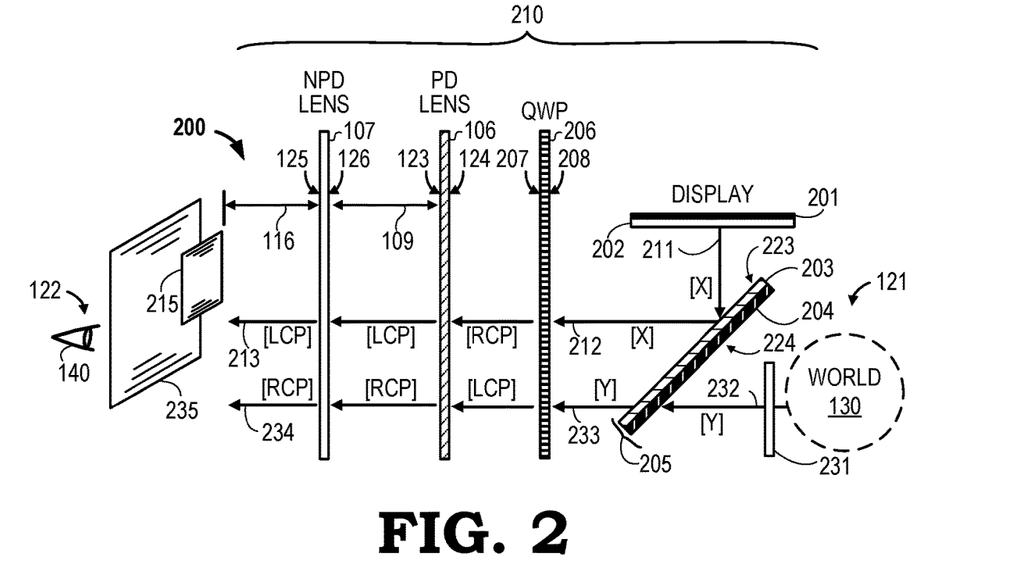
FIG. 2 is a block diagram of a system providing a PD lens for an HMD according to some embodiments.

FIG. 2 is a cross-section view of a system 200 having a PD lens for an HMD according to some embodiments. The system 200 includes various components along a light path 210 between a world-facing side 121 and an eye-ward side 122 of the system 200. The block diagram is a side view of light in the system 200. From right to left, the system 200 includes at least a display 201 having light emitting elements, a beam splitter 205, a quarter wave plate (QWP) 206, a PD lens 106, and a NPD lenses 107. The beam splitter 205 includes one or more layers or components to adapt light incident onto the PD lens 106. The beam splitter 205 includes a first surface 223 and a second surface 224. In terms of components, as illustrated, the beam splitter 205 includes a PBS 203 and an LP 204. In some embodiments, components of the beam splitter 205 take the form of one or more passive layers having certain light-altering properties. As illustrated, the beam splitter 205 is oriented at an incidence angle (not labeled) of approximately 45 degrees relative to a user eye 140 at the eye-ward side 122 of the light path 210. The beam splitter 205 is positioned at a non-zero angle with respect to one or more components in the light path 210.

The display 201 provides (display) light 211 of a first quality labeled [X] to the beam splitter 205. In certain embodiments, the display 201 includes one or more layers 202 of a material (e.g., a film, a coating, a lens) near, adjacent, or contiguous thereto that alters one or more qualities of light emitted from the display 201. By way of example, one of the layers 202 is a linear polarizer (LP) or linear polarizing film and the first light quality [X] is linear polarization along a first axis (e.g., x-axis). All of the display light 211 in the [X] linear polarization state that is incident on the PBS 203 is reflected toward a second surface 208 of the QWP 206. Based on the QWP 206, RCP light leaves a first surface 207 of the QWP 206 and is incident on a second surface 124 of the PD lens 106. In some embodiments, the QWP 206 is positioned onto or adjacent to the PD lens 106 such that the first surface 207 of the QWP 206 is adjacent to the second surface 124 of the PD lens 106. Based on the properties of the PD lens 106, RCP light is changed to LCP light when leaving the first surface 123 of the PD lens 106. LCP light is then incident on the second surface 126 of the NPD lens 107 after traveling a distance 109 from the first surface 123 of the PD lens 106. LCP light 213 leaves the first surface 125 of the NPD lens 107 and is provided at a distance 116 on the eye-ward side 122 of the system 200.

Starting at a world-facing side 121 of the system 200, a second light path is used to direct light from a world-facing scene 130 to the user eye 140. According to some embodiments, a world-facing component 231 is disposed between the beam splitter 205 and the world-facing scene 130 to alter light from the world-facing scene 130 destined for the user eye 140. Based on the world-facing component 231, light 232 has a second quality [Y]. By way of example, the second light quality [Y] is linearly polarized along a second axis orthogonal to the first axis (e.g., a y-axis). Light 232 having the second quality passes through the beam splitter 205 and light 233 is incident on the QWP 206. Based on the QWP 206, and due to the second light quality [Y] of the light 233, LCP light leaves the first surface 207 of the QWP 206 and is incident on the second surface 124 of the PD lens 106. Light 234 in the RCP state exits the first surface of the NPD lens 107.

An output from the system 200 at the eye-ward side 122 includes at least two focal planes 215, 235 with respect to the user eye 140. A first focal plane 215 is based on light 211 emitted from the display 201. Based on a first state of the PD lens 106, LCP light from the first surface 123 of the PD lens 106 is provided to the second surface 126 of the NPD lens 107.

Based on the various components, and properties thereof, in the system 200, the LCP light 213 and the RCP light 234 are formed into the first focal plane 215 and the second focal plane 235, respectively, at the eye-ward side 122 of the system 200. Based at least in part on a distance 109 between the PD lens 106 and the NPD lens 107, the first and second focal planes 215, 235 are provided at a distance 116 on the eye-ward side 122 of the system 200.

In at least one embodiment, the PD lens 106 exhibits different refractive powers according to the characteristics of light incident thereon (e.g., incident light). For example, the PD lens 106 exhibits different refractive powers according to polarization directions of the incident light. The PD lens 106 thereby may be referred to as an incident light-dependent lens unit or a polarization-dependent lens or lens unit. The PD lens 106 may have a positive first refractive power with respect to the first light path light resulting in the first focal plane 215 and may have a second refractive power different from the first refractive power with respect to the second light path light resulting in the second focal plane 235. For example, the second refractive power has a same magnitude but opposite sign of the first refractive power, and the PD lens 106 and NPD lens stack have zero optical power for the second light path. Thus, the PD lens 106 functions as a lens having a positive (+) refractive power with respect to the first light path light and functions as a flat plate (transparent medium) with respect to the second light path.

Figure 3:
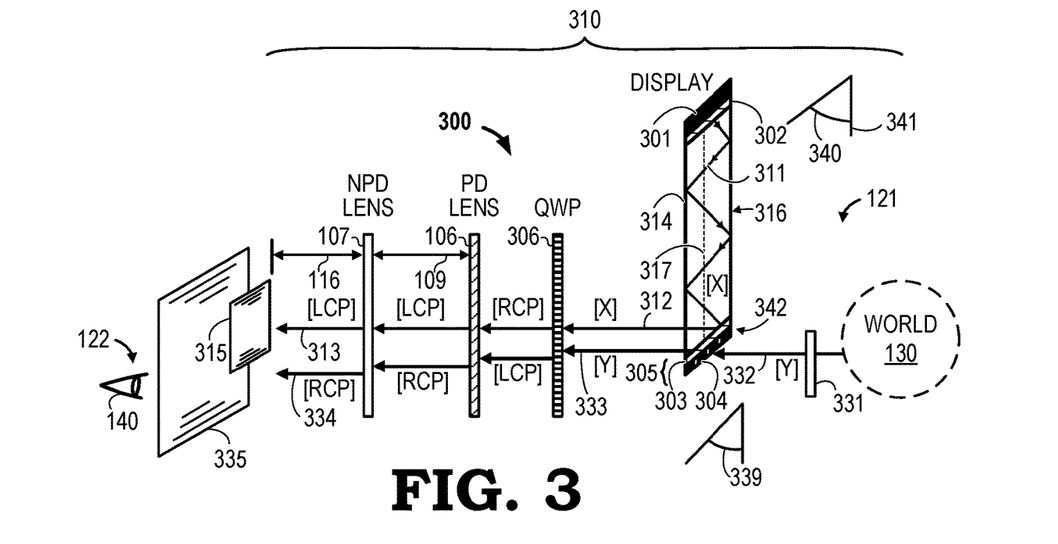
FIG. 3 is a block diagram of a system providing a PD lens for an HMD according to some embodiments.

FIG. 3 is a cross-section view of a system 300 having a PD lens for an HMD according to some embodiments. The system 300 includes various components along a light path 310 between a world-facing side 121 and an eye-ward side 122 of the system 300. The block diagram is a side view of light in the system 300. From right to left, the system 300 includes at least a display 301 having light emitting elements where the display 301 is on a proximal side of a waveguide 314 that directs light toward a beam splitter 305. Light 311 from the display 301 ("display light") generally is directed perpendicularly away from a top surface of the display 301. An axis 341 of the waveguide 314 runs substantively parallel with at least one surface 316 of the waveguide 314 or parallel with a central axis 317 of the waveguide 314 where the central axis as used herein is a direction along which light is directed by reflection, in the waveguide 314, relative to a point in a plane through which light enters the waveguide 314. Light 311 is reflected one or more times from one or more surfaces of the waveguide 314 before reaching the beam splitter 305. The beam splitter 305 is oriented at a first angle 339 with respect to the axis 341, and the display 301 is oriented at a second angle 340 with respect to the axis 341. In some embodiments, the first angle 339 is substantively equal to the second angle 340. In other embodiments, these angles 339, 340 are different from one another.

The system 300 includes the beam splitter 305 at a position on a distal side 342 of the waveguide 314. The system 300 also includes a quarter wave plate (QWP) 306, a PD lens 106, and a NPD lenses 107 in the order shown with the NPD lens 107 at the eye-ward side 122 of the system 300. The beam splitter 305 includes one or more layers or components to alter light and direct light onto the PD lens 106. As illustrated, the beam splitter 305 includes a PBS 303, and an LP 304. In some embodiments, components of the beam splitter 305 take the form of one or more passive layers having certain light-altering properties. The beam splitter 305 is oriented at an incidence angle (not labeled) of approximately 45 degrees relative to a user eye 140 at the eye-ward side 122 of the light path 310.

At the proximal side of the waveguide 314, one or more layers 302 (e.g., a film, a coating, a lens) adjacent to the display 301 alter light emitted from the display 301. The waveguide 314 directs the display light 311 through total internal reflection (TIR) from the proximal side to the distal side of the waveguide 314. When the system 300 is assembled, there is little to no world light leakage, thereby people in front of a user wearing the system 300 would not see light reflected from the waveguide 314. The display 301 provides the light 311 of a first quality labeled [X] to the beam splitter 305. The one or more layers 302 of material adjacent facilitates providing the first quality [X] to the light emitted from the display 301. By way of example, the first light quality [X] is linearly polarized along a first axis (e.g., x-axis). At least some of the light 311 incident on the PBS 303 is reflected toward the QWP 306. Based on the QWP 306, RCP light leaves the QWP 306 and is incident on the PD lens 106. In some embodiments, when assembled, the QWP 306 is positioned onto or adjacent to the PD lens 106 such that a surface of the QWP 306 is adjacent to a surface of the PD lens 106. Based on the properties of the PD lens 106, RCP light is changed to LCP light when leaving the PD lens 106. LCP light is then incident on the NPD lens 107 after traveling a distance 109 from the PD lens 106. LCP light 113 leaves the NPD lens 107 and is directed to and focused a distance 116 on the eye-ward side 122 of the system 300.

Starting at a world-facing side 121 of the system 300, a second light path to the user eye 140 involves light from a world-facing scene 130. A world-facing component 331 is present between the beam splitter 305 and the world-facing scene 130 to alter light from the world-facing scene 130 destined for the user eye 140. Based on the world-facing component 331, light 332 has a second quality [Y]. By way of example, the second light quality [Y] is linearly polarized along a second axis orthogonal to the first axis (e.g., a y-axis). Light 332 having the second quality passes through the beam splitter 305 and light 333 is incident on the QWP 306. Based on the QWP 306, and due to the second light quality [Y] of the light 333, LCP light leaves the QWP 306 and is incident on the PD lens 106. Light 334 in the RCP state exits the NPD lens 107.

An output from the system 300 at the eye-ward side 122 includes at least two focal planes 315, 335 with respect to the user eye 140. A first focal plane 315 is based on light 311 emitted from the display 301. Based on a first state of the PD lens 106, LCP light from the PD lens 106 is directed to the NPD lens 107. Based on the various components, and properties thereof, in the system 300, the LCP light 313 and the RCP light 334 are formed into the first focal plane 315 and the second focal plane 335, respectively, at the eye-ward side 122 of the system 300. Based at least in part on a distance 109 between the PD lens 106 and the NPD lens 107, the first and second focal plane 315, 335 are provided in focus at a distance 116 on the eye-ward side 122 of the system 300.

Figure 4:
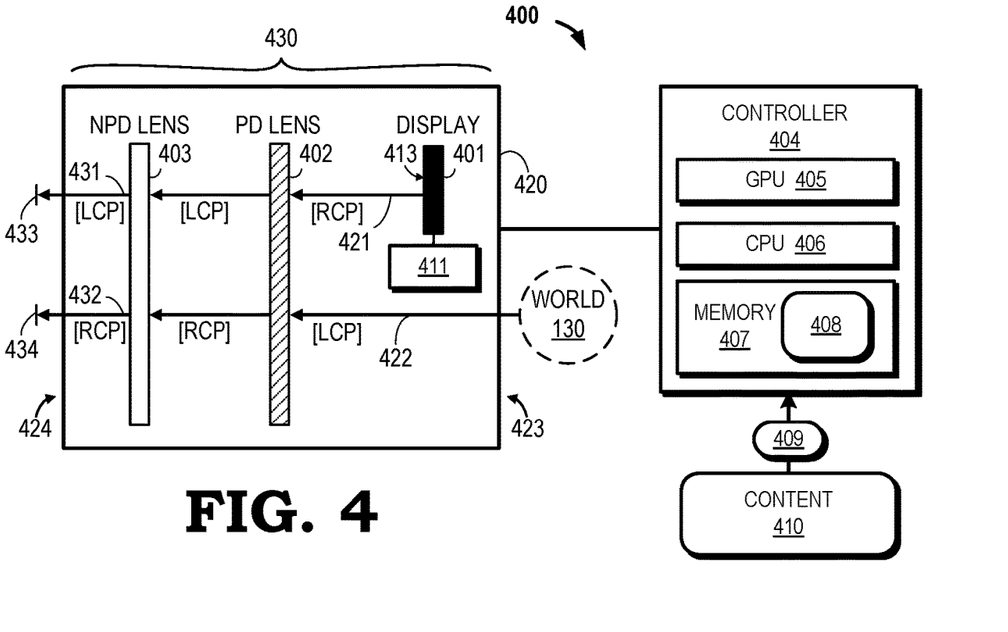
FIG. 4 is a block diagram of a device having a PD augmented reality display according to some embodiments.

FIG. 4 is a block diagram of a system 400 having a polarization-dependent augmented reality display according to some embodiments. For sake of convenience of illustration, certain components of the system 400 are omitted. The system 400 includes an HMD 420, and a controller 404 for the HMD 420. The HMD 420 includes a plurality of electronic components including a PD lens 402 and a display 401. The HMD 420 also includes an NPD lens 403. The HMD 420 also includes a first controller 411 for the display 401. The first controller 411 is display controller (DC) that is coupled to and operates the display 401. A first surface 413 of the display 401 is curved according to a radius of curvature in some embodiments. This curvature may be matched to a curvature of another component in the system 400 such as a surface of the PD lens 402 and a surface of the NPD lens 403. The HMD 420 provides a light path 430 from the display 401 at a first side 423 to a second side 424 of the system 400 at a distal side of the NPD lens 403. Operations of the display controller 411 and any other controller in the system 400 are coordinated so as to provide at least two focal planes at the second side 424 of the system 400.

While the controller 404 is illustrated adjacent to the HMD 420, in certain embodiments, the two components—the HMD 420 and the controller 404—are physically separated from each other and communicate with each other via one or more wires or wirelessly over a radio or wireless protocol via radio waves. In at least some embodiments, components of at least the HMD 420 are mounted to structures proximate to eyes of a user (not illustrated).

As shown in FIG. 4, the controller 404 includes a set of one or more processors, such as the illustrated graphics processing unit (GPU) 405 and the central processing unit (CPU) 406. The controller 404 also includes one or more storage components, such as a memory 407, to store software programs or other executable instructions that are accessed and executed by the processors 405, 406 so as to manipulate the one or more of the processors 405, 406 to perform various tasks as described herein. Such software programs include, for example, a rendering program 408 including executable instructions for providing content to the display 401.

In operation, the controller 404 receives rendering information 409 (e.g., display content) from a local or remote content source 410, where the rendering information 409 represents graphics data, video data, or other data representative of an object or scene that is the subject of light to be rendered and displayed at the HMD 420. The HMD 420 uses the display 401 to provide a first light 421 to the PD lens 402. The HMD 420 is at least partially translucent whereby the HMD 420 allows light 422 from a world-facing scene 130 to enter at the first side 423 of the HMD 420 and to pass therethrough to the second side 424 to reach the user eyes.

By executing the rendering program 408, the CPU 406 uses the rendering information 409 to send instructions to the GPU 405 or directly to the HMD 420 by way of a control signal for operation of the display 401. As part of this rendering process, the CPU 406 may receive pose information from an inertial management unit (IMU) (not illustrated), whereby the pose information is representative of a pose of the HMD 420 and control the emission of light by the display 401, and generate lightfield data in certain embodiments to reflect a viewpoint of an object or scene from a pose on the display 401. The pose information includes at least a location in space and an orientation relative to the location thereby providing six aspects of visual data.

When received, the HMD 420 provides instructions to the display 401 and the PD lens 402 by providing instructions to the controller 411. For example, the display 401 provides circularly polarized light 421 such as right-handed circularly polarized (RCP) as illustrated. Based on the instructions, the controller 411 and the PD lens 402 directs light through the NPD lens 403 at focal planes 433, 434 at the second side 424 of the system 400 for the user. In some embodiments, the two focal planes 433, 434 are based on respective light paths as illustrated. By providing two or more focal planes 433, 434, the user (not illustrated) is then free to observe light and objects at the second side 424 of the system 400 including choosing where to focus and accommodate vision based on the light provided at the locations or planes 433, 434.

Figure 5:
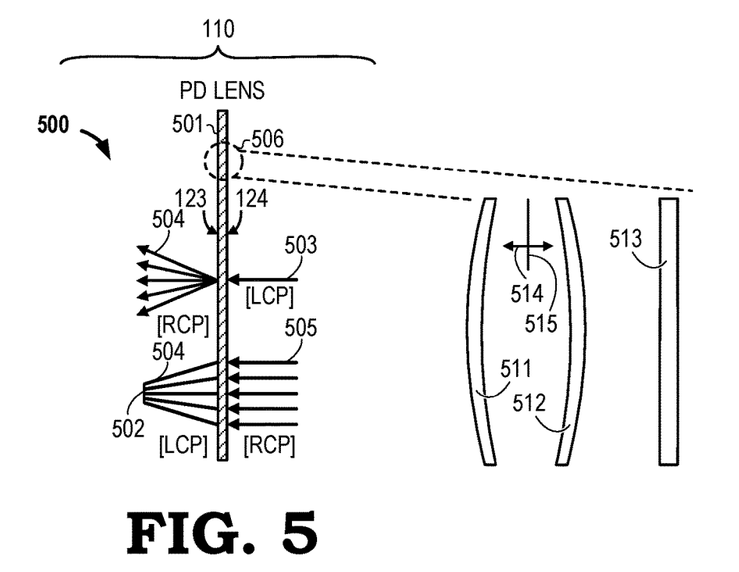
FIG. 5 is a diagram of a PD lens according to some embodiments.

FIG. 5 is a diagram of a PD lens 501 for use with a polarization-dependent augmented reality display system 500 according to some embodiments. The PD lens 501 has a first surface 123 and a second surface 124. The PD lens 501 is used in a light path such as the light path 110 as shown and as in the system 100. LCP light 503 that is incident on the second side 124 of the PD lens 501 is divergent when the PD lens 501 is in a particular state such as a first PD state. When collimated LCP light is incident on the PD lens 501, the output light becomes diverged because the PD lens 501 has negative optical power for the LCP light 503. The LCP light 503 is changed to RCP light 504 as the light passes through the PD lens 501 and emerges at the first side 123.

Based on the first PD state, the RCP light 505 that is incident on the second side 124 of the PD lens 501 is directed at a focal plane 502 at a particular distance when the PD lens 501 is in a particular state such as the first PD state. The RCP light 505 is transmuted to LCP light 504 as the light passes through the PD lens 501 and emerges at the first side 123. In this fashion, the PD lens 501 is put to effective use in an augmented reality display system such as the systems 100, 200, 300 described previously.

In some embodiments, a body of the PD lens 501 has a curvature as indicated in embodiments in the inset 506. That is, the first side 123, the second side 124, or both the first and second sides 123, 124 of the PD lens 501 have a respective radius of curvature 514 relative to a reference plane 515. For example, the PD lens 501 has a convex form 511 or one or more convex surfaces, a concave form 512 or one or more concave surface, or a planar form 513 where one or more surfaces are planar.

Figure 6:
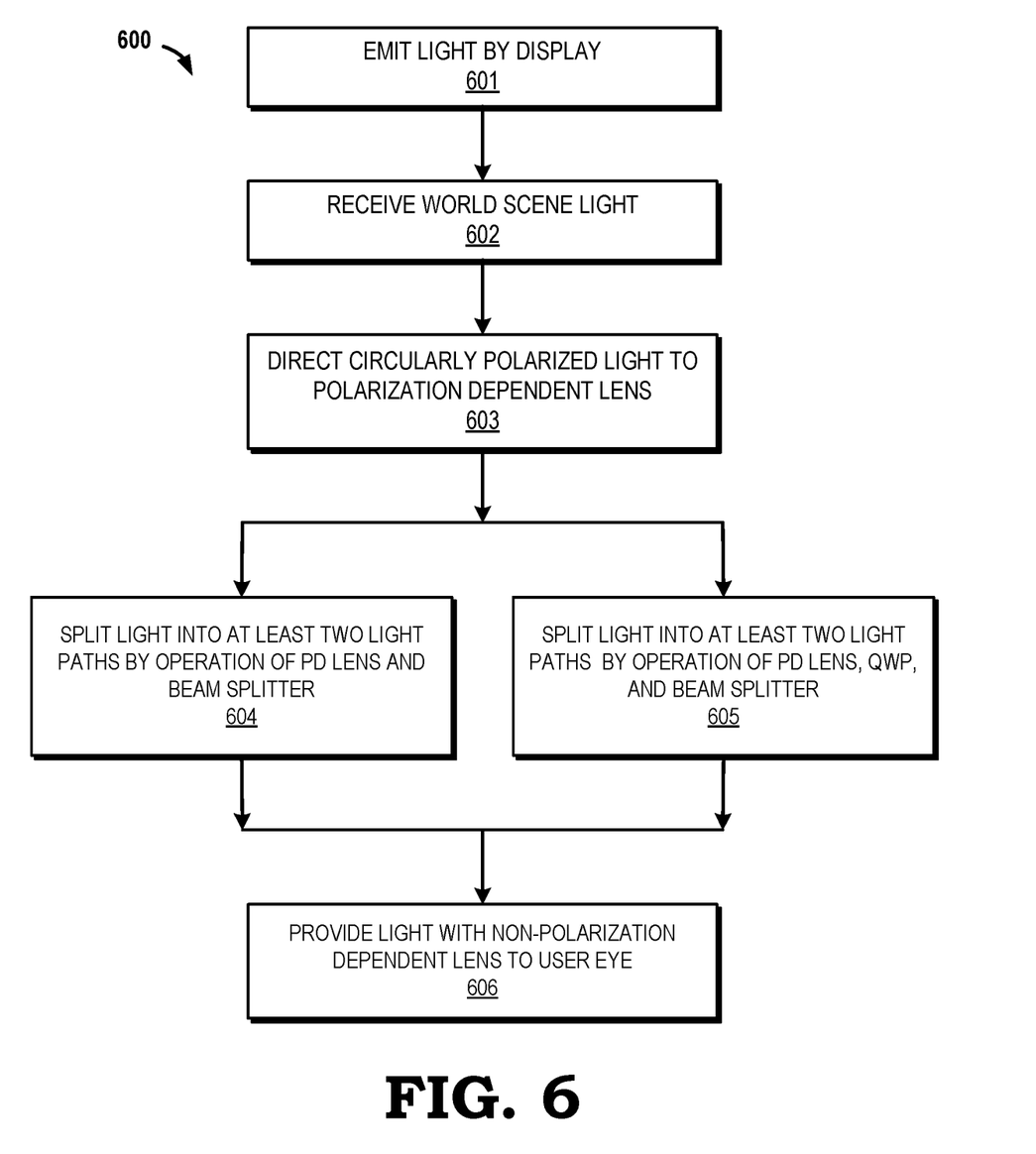
FIG. 6 is a block diagram of a method for providing light with a PD lens in an augmented reality system according to some embodiments.

FIG. 6 is a block diagram of a method 600 for providing light with a PD lens in an AR system according to some embodiments. The method 600 may be implemented in an HMD configured as illustrated by, for example, the HMD 420 illustrated in FIG. 4 and implementing a lens system as illustrated by systems 100, 200, 300, and 400 as in FIGS. 1-4. At block 601, the method 600 includes emitting light by a display such as the display 101. At block 602, world-facing scene light is received into device having a PD lens. At block 603, direct circularly polarized light to or onto a PD lens. Depending on an arrangements of components, the method 600 includes at least two alternatives for creating multiple light paths. At block 604, the method 600 includes splitting light by at least operation of the PD lens, and presence of an NPD lens and a beam splitter such as the beam splitter 105. At block 605, the method 600 alternatively includes splitting light by at least operation of the PD lens, and presence of the NPD lens, a QWP such as the QWP 206, and a beam splitter such as the beam splitter 205. At block 606, light is provided with a NPD lens to a user eye.

Broadly, the method 600 includes emitting light by a display and receiving world-facing scene light into the AR system. These two sources of light are incident onto or received at the beam splitter. Light from the display is reflected by the beam splitter toward the polarization-dependent lens. In some embodiments, the light incident on the beam splitter is circularly polarized light or linearly polarized light. Light incident on the polarization-dependent lens is based on the world-facing scene light and the light generated by the display. The polarization-dependent lens directs polarized light to and through a non-polarization-dependent lens at an eye-ward side of the AR system. In some arrangement of components of the AR system, light directed to the polarization-dependent lens is passed through a quarter wave plate to create circularly polarized light incident on the polarization-dependent lens.

While many of the embodiments of components described herein are illustrated as having flat surfaces, one or more components of the HMDs and devices illustrated herein may have one or more surfaces that are curved in some embodiments. For example, a curvature may be along a first axis and is referred to as a horizontal arc along a certain number of degrees of azimuth with respect to the systems 100, 200, 300, 400 and the user as illustrated as the user eye 140. A curvature along a second axis may be referred to as a vertical arc along a certain number of degrees of altitude. A third axis is an optical axis relative to the user eye 140 and for the optical elements of the systems and devices described and illustrated.

Generally, in the systems and devices, a non-illustrated coating or plurality of coatings may be applied to a first surface or a second surface of a substrate or illustrated component such as a substantially transparent optical plane parallel plate (PPP), and a coating or plurality of coatings is applied to another layer in the system such as a linear polarizer layer or another layer (e.g., a film, a coating, the PBS 103) to alter a characteristic of the light passing through the system. For sake of clarity, one or more PPPs are omitted from illustration and are part of one or more components of the systems as understood by those in the art. In the systems and devices, while not illustrated at all positions therein, the light therein may be in a first light state [Y] or a second light state [X] at one or more positions. In some embodiments, the first light state [Y] is linearly polarized along a first axis referred to as a y-axis. The second light state [X] is different from the first light state [Y] based at least in its respective linearly polarized state as the two states [X], [Y] are linearly polarized along orthogonal axes relative to each other. Light in these two states [X], [Y] are converted in the systems and devices into either the RCP state or the LCP state. An electro-optic polarization element or sub-system produces circularly polarized light, and whose handedness of circular polarization can be switched between a left handedness and a right handedness or directed by operation of an electrical bias source applied to the polarization element.

Also, as understood by those in the art, the components are not drawn to scale and are illustrated in an exploded view for sake of clarity. Variations in positions and angles are possible depending on one or more factors including composition of each component. In some embodiments, certain aspects of the techniques described above may implemented by one or more processors of a processing system executing software and provided as instructions to control one or more aspects of the components described herein. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements or components included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An augmented reality device comprising:
   a beam splitter to receive display light from a display at a first surface of the beam splitter and to receive world-facing scene light at a second surface of the beam splitter;
   a polarization-dependent lens to:
   receive reflected display light from the display from the beam splitter, and
   receive world-facing scene light that has passed through the beam splitter, wherein the polarization-dependent lens in a first electro-magnetic state exhibits a first behavior has-having a first, positive focal length with respect to light of a first polarization state, and a second, negative focal length for incident light in a second polarization state, and in a second electro-magnetic state exhibits a second behavior with respect to light incident thereon which is different from the first behavior so that the polarization-dependent lens is configured to control delivery of light to a user by directing light to a desired location; and
   a non-polarization-dependent lens positioned at an eye-ward side of the polarization-dependent lens to direct the display light and the world-facing scene light, incident thereon, at the eye-ward side of the augmented reality device.

2. The augmented reality device of claim 1, wherein the display light incident on the polarization-dependent lens is in a first polarization state, and wherein the world-facing scene light incident on the polarization-dependent lens is in a second polarization state different from the first polarization state.

3. The augmented reality device of claim 2, wherein the first polarization state is a right-hand circularly polarized (RCP) state, and wherein the second polarization state is a left-hand circularly polarized (LCP) state.

4. The augmented reality device of claim 1, further comprising:
   a quarter wave plate positioned between the beam splitter and the polarization-dependent lens.

5. The augmented reality device of claim 1, wherein the beam splitter includes a quarter wave plate.

6. The augmented reality device of claim 1, wherein the non-polarization-dependent lens is a refractive lens having a convex first surface and a second surface that receives light from the polarization-dependent lens.

7. The augmented reality device of claim 1, wherein the non-polarization-dependent lens is a Fresnel lens having prisms of varying dimensions, from prism to prism, on a second surface.

8. The augmented reality device of claim 1, wherein the non-polarization-dependent lens is a diffractive lens having a generally planar first surface and prisms of a generally uniform dimension, from prism to prism, on a second surface.

9. The augmented reality device of claim 1, wherein the display is oriented approximately perpendicular to one or more of the polarization-dependent lens and the non-polarization-dependent lens.

10. A head mounted display (HMD), comprising an augmented reality device of claim 1, the beam splitter receiving display light from the HMD and the polarization-dependent lens receiving reflected display light from the HMD from the beam splitter.

11. A head mounted display (HMD) device, comprising:
    a beam splitter oriented at an angle with respect to a display of the HMD device to receive display light from the display at a first side of the beam splitter and to receive world-facing scene light at a second side of the beam splitter;
    a polarization-dependent lens positioned on an eye-ward side of the beam splitter, the polarization-dependent lens configured to operate in a first electro-magnetic state or a second electro-magnetic state, the first electro-magnetic state and the second electro-magnetic state differing in their effect on at least one of a direction or focus of incident light based on a polarization state of the incident light to control delivery of the incident light to a user by directing the incident light to a desired location; and
    a non-polarization-dependent lens positioned at an eye-ward side of the polarization-dependent lens to direct the display light and the world-facing scene light, incident thereon, at the eye-ward side of the HMD.

12. The HMD device of claim 11, further comprising:
    a linear polarizer positioned between the display and the beam splitter.

13. The HMD device of claim 11, further comprising:
    a quarter wave plate positioned between the beam splitter and the polarization-dependent lens.

14. The HMD device of claim 11, further comprising:
    a quarter wave plate positioned on the first side of the beam splitter between the display and the beam splitter.

15. The HMD device of claim 11, wherein the non-polarization-dependent lens is a refractive lens having a continuously convex surface.

16. The HMD device of claim 11, wherein the non-polarization-dependent lens is a refractive lens having a generally planar first surface and prisms of a generally uniform dimension on a second surface.

17. The HMD device of claim 11, further comprising:
a waveguide positioned between the display and the beam splitter such that display light from the display reflects from one or more surfaces of the waveguide toward the beam splitter.

18. The HMD device of claim 17, wherein the beam splitter is oriented at a first non-zero angle with respect to an axis of the waveguide.

19. The HMD device of claim 18, wherein the display is oriented at a second non-zero angle with respect to the axis of the waveguide.

20. The HMD device of claim 19, wherein the second non-zero angle is different from the first non-zero angle.

21. A method for providing light in an augmented reality (AR) system, the method comprising:
emitting display light by a display;
receiving world-facing scene light into the AR system and the display light at a beam splitter;
operating a polarization-dependent lens in one of a first electro-magnetic state or a second electro-magnetic state, wherein the first electro-magnetic state and the second electro-magnetic state differ in their effect on at least one of a direction or focus of incident light based on a polarization state of the incident light to control delivery of the incident light to a user by directing the incident light to a desired location;
directing circularly polarized light from the beam splitter to the polarization-dependent lens based on the world-facing scene light and the display light generated by the display; and
directing polarized light through a non-polarization-dependent lens at an eye-ward side of the AR system.

22. The method of claim 21, wherein the polarization-dependent lens is operated to pass display light emitted from the display and world-facing scene light through a quarter wave plate.

23. The method of claim 21, wherein
the world-facing scene light that has passed through the beam splitter is received by the polarization-dependent lens, wherein the polarization-dependent lens in a first electro-magnetic state has a first, positive focal length with respect to light of a first polarization state, and wherein the polarization-dependent lens in the first electro-magnetic state has a negative focal length for incident light in a second polarization state; and
the non-polarization-dependent lens is positioned at an eye-ward side of the polarization-dependent lens to direct the display light and the world-facing scene light, incident thereon, at the eye-ward side of the system.

* * * * *